United States Patent
Comair et al.

(10) Patent No.: US 9,342,918 B2
(45) Date of Patent: *May 17, 2016

(54) SYSTEM AND METHOD FOR USING INDIRECT TEXTURING TO EFFICIENTLY SIMULATE AND IMAGE SURFACE COATINGS AND OTHER EFFECTS

(71) Applicant: Nintendo Co., Ltd., Kyoto (JP)

(72) Inventors: Claude Comair, Redmond, WA (US);
Sun Tjen Fam, Redmond, WA (US);
Prasanna Ghali, Redmond, WA (US);
Jonathan J. Johnson, Bellevue, WA (US)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/587,741

(22) Filed: Dec. 31, 2014

(65) Prior Publication Data

US 2015/0109291 A1 Apr. 23, 2015

Related U.S. Application Data

(63) Continuation of application No. 12/198,217, filed on Aug. 26, 2008, now Pat. No. 8,972,230, which is a continuation of application No. 10/292,489, filed on Nov. 13, 2002, now Pat. No. 7,539,606.

(60) Provisional application No. 60/331,395, filed on Nov. 15, 2001.

(51) Int. Cl.
*G06G 7/50* (2006.01)
*G06T 15/04* (2011.01)
(Continued)

(52) U.S. Cl.
CPC ............... *G06T 15/04* (2013.01); *G06T 13/60* (2013.01); *G06T 17/20* (2013.01); *A63F 2300/663* (2013.01); *A63F 2300/6615* (2013.01)

(58) Field of Classification Search
None
See application file for complete search history.

(56) References Cited

U.S. PATENT DOCUMENTS 5,325,472 A 6/1994 Horiuchi et al.
5,325,480 A 6/1994 Rice
5,347,621 A 9/1994 Zimmer
(Continued)

OTHER PUBLICATIONS

Keahey The Generalized Detail-In-Context Problem Proceedings of IEEE Visualisation 1998, Information Visualization Symposium, Oct. 1998.*

(Continued)

*Primary Examiner* — Saif Alhija
*Assistant Examiner* — Cuong Luu
(74) *Attorney, Agent, or Firm* — Nixon & Vanderhye P.C.

(57) ABSTRACT

Water surface and other effects are efficiently simulated to provide real time or near real time imaging on low-capacity computer graphics computation platforms. Water and other surfaces are modeled using multiple independent layers can be dynamically adjusted in response to real time events. The number of layers used in a given area can be adjusted to reduce computational loading as needed. Different algorithms can be employed on different layers to give different effects. The multiple layer modeling is preferably converted to polygons using an adaptive polygon mesh generator based on camera location and direction in the 3D world to provide automatic level of detailing and generating a minimal number of polygons. The visual effects of water droplets and other coatings on see-through surfaces can be modeled and provided using indirect texturing.

7 Claims, 10 Drawing Sheets

(51) Int. Cl.
*G06T 13/60* (2011.01)
*G06T 17/20* (2006.01)

(56) References Cited

U.S. PATENT DOCUMENTS

| | | | |
|---|---|---|---|
| 5,475,507 A | 12/1995 | Suzuki et al. | |
| 5,490,240 A | 2/1996 | Foran et al. | |
| 5,537,641 A | 7/1996 | da Vitoria Lobo et al. | |
| 5,360,718 A | 5/1997 | Montag et al. | |
| 5,680,525 A * | 10/1997 | Sakai et al. | 345/585 |
| 5,877,777 A | 3/1999 | Colwell | |
| 5,898,438 A * | 4/1999 | Stewart et al. | 345/419 |
| 5,966,129 A | 10/1999 | Matsukuma et al. | |
| 6,005,582 A | 12/1999 | Gabriel et al. | |
| 6,030,289 A | 2/2000 | Nomi et al. | |
| 6,052,131 A | 4/2000 | Oka | |
| 6,057,847 A | 5/2000 | Jenkins | |
| 6,100,893 A | 8/2000 | Ensz et al. | |
| 6,121,977 A | 9/2000 | Arai et al. | |
| 6,154,576 A | 11/2000 | Anderson et al. | |
| 6,198,489 B1 | 3/2001 | Salesin et al. | |
| 6,405,151 B1 | 6/2002 | Fujii et al. | |
| 6,485,369 B2 | 11/2002 | Kondo et al. | |
| 6,500,008 B1 | 12/2002 | Ebersole et al. | |
| 6,504,569 B1 | 1/2003 | Jasinschi et al. | |
| 6,512,999 B1 | 1/2003 | Dimas et al. | |
| 6,664,971 B1 * | 12/2003 | Mukherjee et al. | 345/582 |
| 6,724,395 B1 | 4/2004 | Treichler | |
| 6,731,278 B2 | 5/2004 | Yokoyama et al. | |
| 6,756,989 B1 * | 6/2004 | Morgan et al. | 345/582 |
| 6,819,333 B1 * | 11/2004 | Sadowski | 345/647 |
| 6,879,324 B1 | 4/2005 | Hoppe | |
| 7,061,502 B1 | 6/2006 | Law et al. | |
| 7,090,577 B2 | 8/2006 | Serizawa et al. | |
| 7,102,652 B2 | 9/2006 | O'Donnell et al. | |
| 7,142,212 B1 * | 11/2006 | Hanai et al. | 345/473 |
| 2001/0040586 A1 | 11/2001 | Yokoyama et al. | |
| 2002/0044153 A1 * | 4/2002 | Hoch et al. | 345/647 |
| 2002/0050988 A1 | 5/2002 | Petrov et al. | |
| 2002/0060682 A1 | 5/2002 | Kohira et al. | |
| 2002/0095276 A1 | 7/2002 | Rong et al. | |
| 2002/0149599 A1 | 10/2002 | Dwyer et al. | |
| 2002/0149626 A1 | 10/2002 | Ozcelik et al. | |
| 2002/0169013 A1 | 11/2002 | Serizawa et al. | |
| 2003/0001843 A1 | 1/2003 | Suzuki et al. | |
| 2003/0011596 A1 | 1/2003 | Zhang et al. | |
| 2003/0035917 A1 | 2/2003 | Hyman | |
| 2003/0038800 A1 | 2/2003 | Kawahara | |
| 2004/0227992 A1 | 11/2004 | Putilin et al. | |
| 2004/0257375 A1 | 12/2004 | Cowperthwaite | |
| 2005/0116949 A1 | 6/2005 | Hoppe | |
| 2005/0213820 A1 | 9/2005 | Liu et al. | |
| 2005/0240384 A1 | 10/2005 | Houston et al. | |
| 2005/0253854 A1 | 11/2005 | Lischinski et al. | |

OTHER PUBLICATIONS

Fang et al. Deformable Volume Rendering by 3D Texture Mapping and Octree Encoding Proceedings of the 7th IEEE Visualization Conference, 1996.*

Web site information, http:\\perfectstorm.warnerbros.com, 2 pages (2000).

Video Cassette, "The Perfect Storm" Warner Brothers Pictures (2000).

Angel, Edward, "Computer Graphics," Addison-Wesley Publishing Company, Inc., pp. 330-345 (1990).

Cross, Robert A., "Interactive Realism for Visualization Using Ray Tracing," Proceedings of the $6^{th}$ IEEE Visualization Conference (Visualization '95) 1070-2385/95 IEEE, pp. 19-26 (1995).

Foster, N., "Practical Animation of Liquids," *Computer Graphics Proceedings SIGGRAPH*, Annual Conference Series 2001, pp. 23-30.

Hojn, Chadwick et al., "Layered Construction for Deformable Animated Characters," Computer Graphics, Vo. 23, No. 3 (Jul. 1989).

Kass, Michael et al., "Rapid, Stable Fluid Dynamics for Computer Graphics," Computer Graphics, vol. 24, No. 4, (Aug. 1990).

Kaufmann, Hannes et al., "Mathematics and Geometry Education With Collaborative Augmented Reality," SIGGRAPH 2002 Educators Program, In SIGGRAPH 2002 Conference Abstracts and Applications, pp. 37-41 (2002).

Keahey, T. Alan et al., "The Generalized Detail-In-Context Problem," Proceedings of IEEE Visualisation '98, Information Visualization Symposium, Oct. 19-20, 1998, 8 pages.

Robertson, B., "ILM'S Effects Crew Plunged Deep Into State-Of-The-Art Technology to Create Digital Water for The Perfect Storm," *Computer Graphics World*, 6 pages (Jul. 2000).

Rusinkiewicz, S. et al., "Qsplat: A Multiresolution Point Rendering System for Large Meshes," *Computer Graphics Proceedings SIGGRAPH*, Annual Conference Series 2000, pp. 343-352.

Ts'O, Pauline et al., "Modeling and Rendering Waves: Wave Tracing Using Beta-Splines and Reflective and Refractive Texture Mapping," ACM Transactions on Graphics, vol. 6, No. 3, pp. 191-214 (Jul. 1987).

Wang et al., "Representing Moving Images with Layers," IEEE Transactions on Image Processing, vol. 3, No. 5, pp. 625-638 (Sep. 1994).

Wittig, Patrick, "Computational Fluid Dynamics in a Traditional Animation Environment," ACM 1999, 0-201-48560-5/99/08, pp. 129-136.

* cited by examiner

*Illustrative Surface Disturbance Imaging Process*

*Illustrative Adaptive Polygon Mesh Determination*

*Illustrative Surface Disturbance Layer Modeling Arrangement*

*Illustrative Wave Modeling Properties*

*Example Rendering Process for Water Droplets and Other Effects*

SYSTEM AND METHOD FOR USING INDIRECT TEXTURING TO EFFICIENTLY SIMULATE AND IMAGE SURFACE COATINGS AND OTHER EFFECTS

CROSS-REFERENCE TO RELATED APPLICATIONS

This application is a continuation of U.S. patent application Ser. No. 12/198,217 filed Aug. 26, 2008; which is a continuation of U.S. patent application Ser. No. 10/292,489, now U.S. Pat. No. 7,539,606; which claims the benefit of U.S. Provisional Application No. 60/331,395 filed Nov. 15, 2001. The entire contents of the prior applications are incorporated herein by reference.

STATEMENT REGARDING FEDERALLY SPONSORED RESEARCH OR DEVELOPMENT

Not Applicable.

BACKGROUND AND SUMMARY OF THE INVENTION

Photorealism has been one of the goals that computer graphics engineers have been striving to achieve ever since the creation of the first computer-generated image. Many modern cinemagraphic, flight simulator and even video game effects all depend on the ability to accurately model the real world—thus allowing a computer to create images that accurately simulate actual scenes.

One recent effective use of computer graphics to simulate the real world was in the Warner Brothers film "The Perfect Storm" released in July 2000. That film told the story of what happened in late October 1991 in the North Atlantic when a low-pressure system filled with cold air bumped into a hurricane filled with warm air. The resulting "perfect storm" produced waves over 100 feet high. Heading straight into that storm was the Andrea Gale, a 72-foot steel fishing boat on her way home to Gloucester Mass. with a hold full of fish and a six-man crew on board.

When Hollywood set out to make a movie about this exciting and terrifying event, they knew they could do some of the film sequences using full size models of boats in large water tanks, but that it would be impossible to recreate a 100-foot wave. The answer was to use computer graphics to model the ocean's surface. They hired a computer graphics special effects company that reportedly used a crew of nearly one hundred computer graphics engineers and technical directors working for more than fourteen months using hundreds of computer graphics workstations to create the film's special effects shots. It reportedly took several hours of computer time to make a few seconds of special effects for the film. The resulting images were quite impressive and realistic but were very expensive and time-consuming to create. See Robertson, "ILM's Effects Crew Plunged Deep Into State-of-the-Art Technology to Create Digital Water for The Perfect Storm", *Computer Graphics World* (July 2000).

Much academic work has also been done in this area in the past. See for example Foster et al., "Practical Animation of Liquids", *Computer Graphics Proceedings, Annual Conference Series*, pp. 23-30 (SIGGRAPH 2001) and papers cited therein. However, further improvements are possible and desirable.

For example, the computer graphics techniques used in "The Perfect Storm" and other high-end cinematic productions are generally far too processor-intensive to be practical for use in routine lower-end computer graphics environments. As one specific example, it is often highly desirable to create realistic water effects for video games. There have been many fun and successful video games in the past relating to water sports such as jet skiing, boating and fishing. However, the typical home video game system or personal computer has a relatively small and inexpensive processor that is being shared among a number of different tasks and therefore does not have a large amount of processing power available for producing water effects. It would be highly desirable to be able to include in such water sports games, realistic effects showing water disturbances such as waves, wakes, splashes, water droplets and other water surface effects. However, to be practical in this environment, any such effects should be implemented in a computationally-efficient manner so they can be imaged in real time (or near real time) using a relatively low-capacity processor such as those found in home video game systems and personal computers.

The present invention solves this problem by providing efficient techniques for modeling and/or rendering water and other effects (e.g., surface disturbances and motions) in an efficient way that can be performed in real time or near real time using relatively low-capability processing resources such as those found in typical home video game systems and personal computers.

In accordance with one aspect of an illustrative and exemplary embodiment, water surface is modeled using multiple layers. Even though the surface of water in the real world generally has only a single layer, the modeling employed in an illustrative embodiment uses multiple layers with different properties and characteristics. For example, one layer may be used to model the general look and feel of the water or other surface. One or more further layers may be used to model waves propagating across the surface. A further layer may be used to model wakes generated by objects moving on the surface. Yet another layer may be used to model disturbances created by objects that have dropped onto the surface. Additional layers may be used to model wind effects, whirlpool effects, etc.

There are several advantages to the illustrative embodiment's approach of using multiple virtual layers to model a single physical surface. For example, the number of layers being used in a given area of a three-dimensional world can be adjusted dynamically depending upon the amount of processing resources available. Different processes and algorithms can be employed on different layers to give each layer a different look and feel. Thus, each layer may affect the game physics differently, and each layer may also affect the surface disturbance rendering differently.

In accordance with another aspect of an illustrative embodiment, a 3D polygon mesh of a surface such as water that is subject to disturbances is generated based on camera location and direction in the 3D world. For example, the polygon mesh may be generated depending on a point location that is interpolated between the camera direction vector and the surface being imaged. As the camera direction becomes more aligned with the surface, the location point will, in an illustrative embodiment, tend toward the intersection of the lower camera frustum vector with the water surface. As the camera direction becomes more perpendicular with respect to the water's surface, the location point tends toward the intersection of the camera direction vector with the water's surface. This technique thus tends to generate smaller polygons near the selected location and larger polygons further from the selected location—such that the parts of the polygon mesh near the selected location have a higher resolution than the parts of the mesh that are further from the selected location. This techniques provides an inherent level of detail feature, resulting in a more uniform polygon size on the screen—minimizing the amount of processing time spent generating small polygons.

The illustrative technique thus generates fewer polygons to cover the same area as compared to a typical uniform grid and also reduces the level of detail feature as the camera becomes more perpendicular to the water's surface. This way, the illustrative technique does not generate skewed polygons when the camera looks directly down onto the surface, but instead generates a perfectly uniformly sized polygon grid in the illustrative embodiment. The illustrative technique also scales the polygon size dynamically based on how far the camera is to the selected location in order to ensure that the polygons on the screen stay roughly the same size without wasting extensive processing resources on rendering very small polygons that will not substantially contribute to the overall image.

In accordance with yet another aspect of an illustrative embodiment, water droplets hitting a window or other see-through surface may be simulated. In this particular illustrative example, an indirect texturing feature is used. In more detail, an indirect texture map is created defining a delta specifying how a water droplet distorts the image to be seen through a transparent or translucent surface such as a window. Each texel of this indirect texture map in the illustrative embodiment is used as an offset for texture coordinate lookup into another texture defining the undistorted version of the area of the screen to which the water droplet will be rendered. In the exemplary and illustrative embodiment, the indirect texture map is comprised of intensity alpha values where one channel specifies the U offset and the other specifies the V offset.

In the illustrative embodiment, the area of the screen to which the water droplet will be rendered is first rendered and then placed (e.g., copied out) into a base texture map. The base texture map is then rendered using the indirect texture map to distort the texture coordinates at each texel. The result is an image that is distorted by the water drop indirect map. This technique is not limited to water droplets and window effects, but can be more generally applied to produce other special effects (e.g., distortion by ice, frost or any other effect as seen through any type of a transparent or translucent object or other imaging surface).

Further exemplary non-limiting advantages provided by an illustrative non-limiting embodiment include:
  realistic wave physics in real time or near real time;
  complex wave geometry in real time or near real time;
  Possible for user or game to adjust wave height from calm to tsunami;
  environment-mapped reflection-mapped wave scape to reflect the surrounding land, trees, clouds, buildings, water craft, and other 3D objects;
  reflection morphs with changing waves and blends into the surface that lies beneath the transparent water;
  waves deform from the pressure of water craft (this can, for example, be used to agitate the surface of the water in front of your opponents, creating a less stable surface);
  adaptive reduction of wave complexity (e.g., adaptive elimination or reduction of large, rolling waves across broad surfaces) to ensure appropriate frame rate even when additional demands are placed on processing resources; and
  realistic water droplet windowing effects.

BRIEF DESCRIPTION OF THE DRAWINGS

These and other features and advantages provided by the invention will be better and more completely understood by referring to the following detailed description of presently preferred embodiments in conjunction with the drawings. The file of this patent contains at least one drawing executed in color. Copies of this patent with color drawing(s) will be provided by the Patent and Trademark Office upon request and payment of the necessary fee. The drawings are briefly described as follows.

DETAILED DESCRIPTION OF PRESENTLY PREFERRED EXAMPLE EMBODIMENTS

Figure 1:
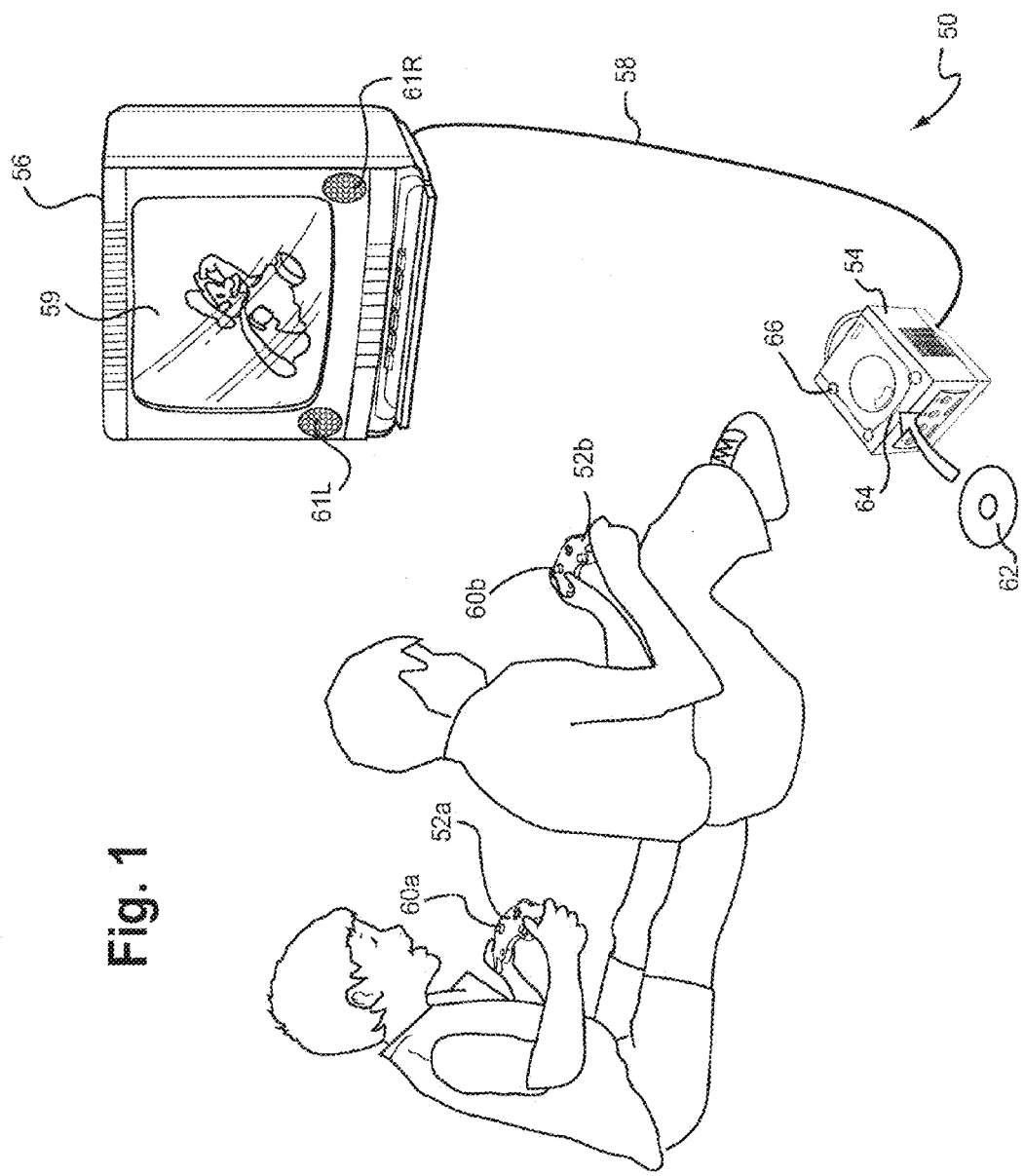
FIG. 1 shows an exemplary, illustrative preferred non-limiting video game system.
Figure 2:
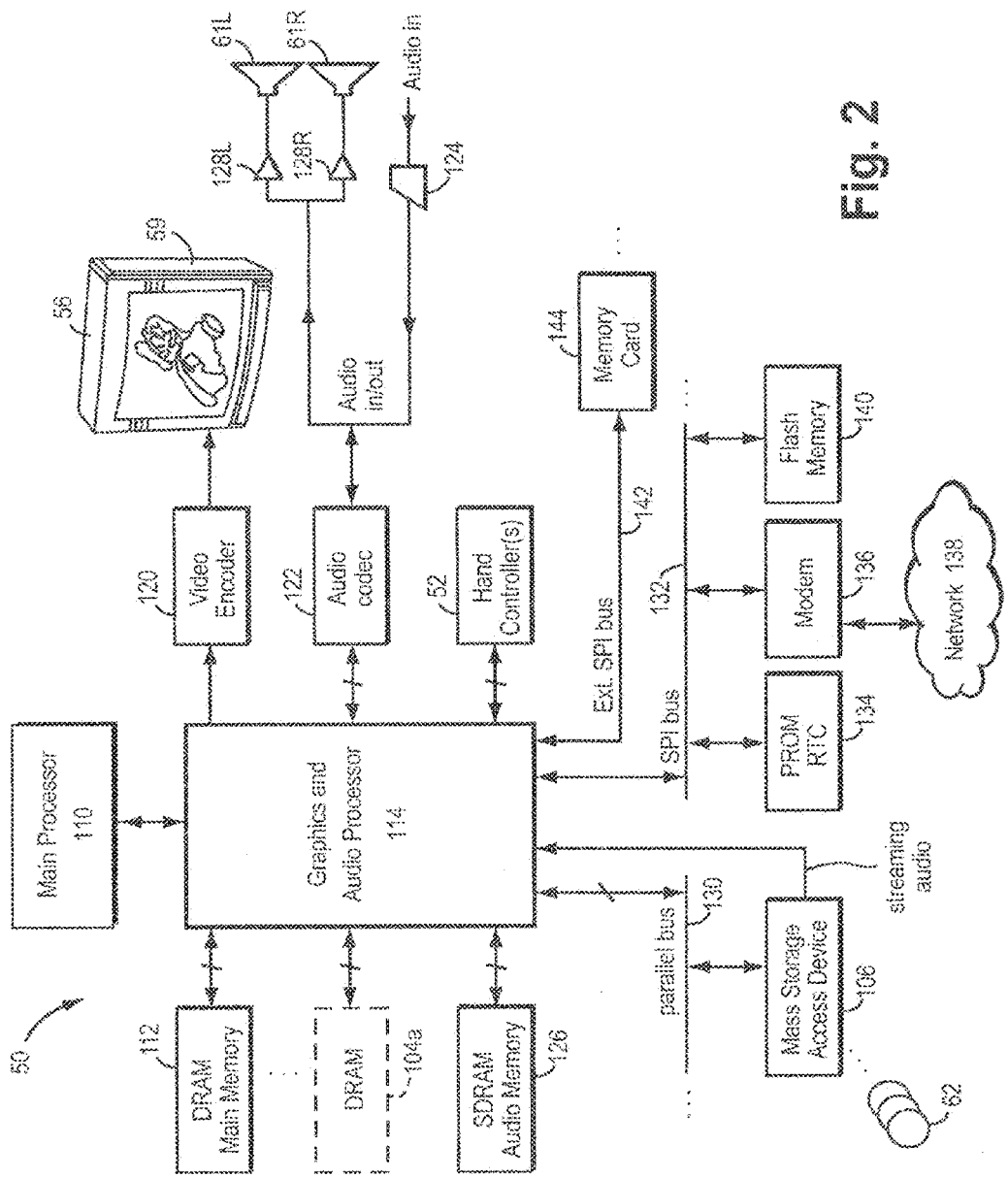
FIG. 2 is a block diagram of the FIG. 1 video game system.

FIG. 1 shows an example interactive 3D computer graphics system 50. System 50 can be used to play interactive 3D video games with interesting stereo sound. It can also be used for a variety of other application. In this illustrative non-limiting example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

More details concerning example video game system 50 including, for example, details relating to system 50's graphics and audio processor 114, and the indirect texturing and frame buffer copy-out capabilities thereof, may be found for example in the following copending commonly-assigned patent applications:

U.S. patent application Ser. No. 09/722,382 entitled "Method and Apparatus for Direct and Indirect Texture Processing in a Graphics System" filed Nov. 28, 2000, and U.S. patent application Ser. No. 09/722,663 entitled "Graphics System with Copy Out Conversions Between Embedded Frame Buffer and Main Memory" filed Nov. 28, 2000.

Example Techniques for Simulating a Water Surface Efficiently

The example preferred illustrative but non-limiting embodiment provides software that executes on system 50 in order to simulate water effects such as waves, splashes, wakes and water droplets. The illustrative embodiment models and renders water surfaces efficiently so that realistic water surface images can be produced in real time or near real time in response to user interactions. For example, the preferred exemplary embodiment is capable of generating and animating the water surface at thirty frames per second for use in a real time interactive video game. The preferred exemplary embodiment is adaptive in that it is capable of drawing different sets of game objects based on camera location and direction in the three-dimensional world.

Figure 3:
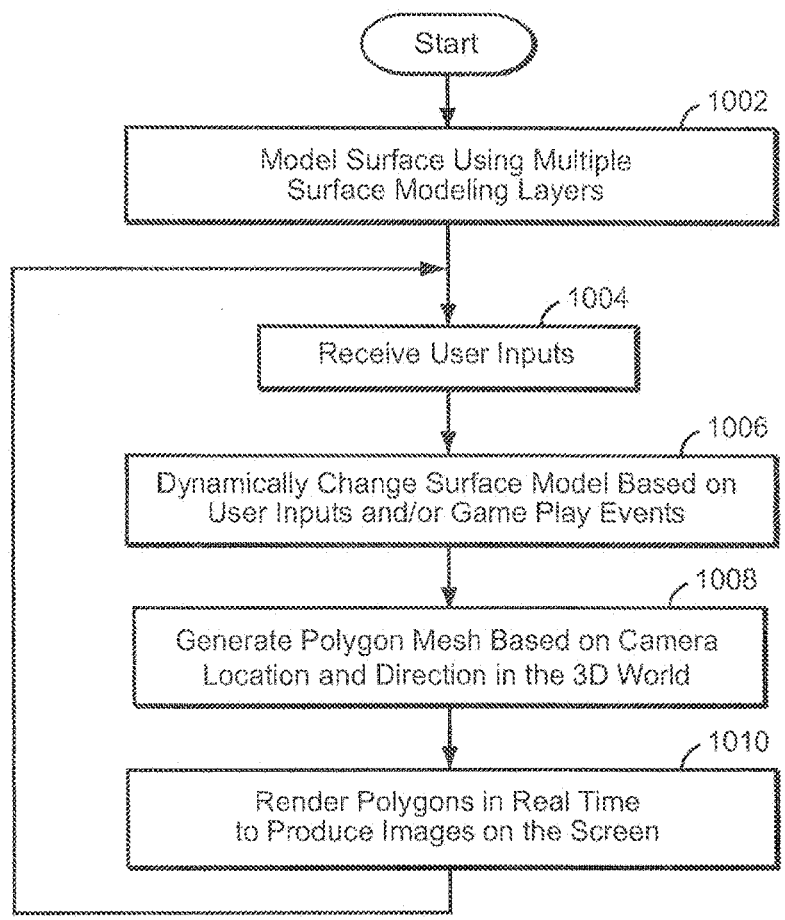
FIG. 3 shows an illustrative surface disturbance imaging process.

FIG. 3 shows an example illustrative surface disturbance modeling and imaging process. In the example embodiment, the surface of water or other fluids is modeled using multiple surface modeling layers (block 1002). Of course, in the real world, water generally has only a single surface. However, the preferred exemplary embodiment models the water surface as a collection of multiple layers each of which may be independently modeled.

System 50 and the preferred illustrative but non-limiting software application executing thereon receives user inputs from game controllers 52a, 52b (block 1004). The preferred exemplary embodiment is capable of dynamically changing one or more layers within the surface model based on user inputs and/or game play events (block 1006). For example, when a user operates a game controller 52a, 52b to cause a jet ski, a fish, or other game play character or object to travel across the water's surface, the illustrative embodiment can create a realistic wake that follows and is behind the object. Similarly, if an object is dropped into the water, the preferred illustrative embodiment can create outwardly-propagating ring waves that propagate along the water's surface. These response can occur in real time response to user inputs. Other dynamic changes can occur in response to predetermined game play events (for example, the onset of a virtual storm can cause the water's surface to become rougher and exhibit higher waves whereas the onset of virtual wind can cause wind-induced waves to propagate across the water's surface).

Once the water surface model has been adjusted in response to current conditions in real time, the preferred exemplary embodiment generates a polygon mesh based on camera location and direction in the three-dimensional world (block 1008). As explained below in more detail, the exemplary embodiment uses an adaptive polygon mesh generator that generates a polygon mesh based on camera location and direction in order to generate fewer polygons and reduce the level of detail as the camera becomes more perpendicular to the water's surface. Once the polygon mesh has been generated, the preferred exemplary and illustrative embodiment generates polygons in real time to produce images on the screen (block 1010).

The preferred illustrative embodiment simulates a water surface efficiently so that it can be used to generate images of water surface in real time. The illustrative embodiment is able to generate and animate the water surface at 30 frame per seconds, and can be used in a video game for example. The illustrative embodiment is adaptive too, and is capable of drawing different sets of game objects based on the camera location and direction in the 3D world.

FIGS. 8A-8D show example visual effects created using the exemplary embodiment.

More Detailed Overview of Water Surface Disturbance Modeling and Rendering

In the illustrative non-limiting embodiment, a water surface disturbance modeling and procedure generally comprises two parts. The first part models the general water surface structure using a plurality of modeling layers. The second part generates polygons for the rendering process based on a polygon mesh that is dynamically created based on camera position and direction.

General Water Surface Modeling

In the real world, water has only one surface. However, the illustrative embodiment considers the water surface as an accumulation of multiple layers of water surface. There are many advantages to breaking up the physical water layer and modeling it as multiple virtual layers. For example, the number of layers used in a given area in the 3D world can be adjusted to reduce the CPU/GPU consumption. Also, different algorithms can be employed on each layer to give different look and feel. Each layer could affect the game physics differently. Each layer could also affect the water rendering differently.

Figure 4:
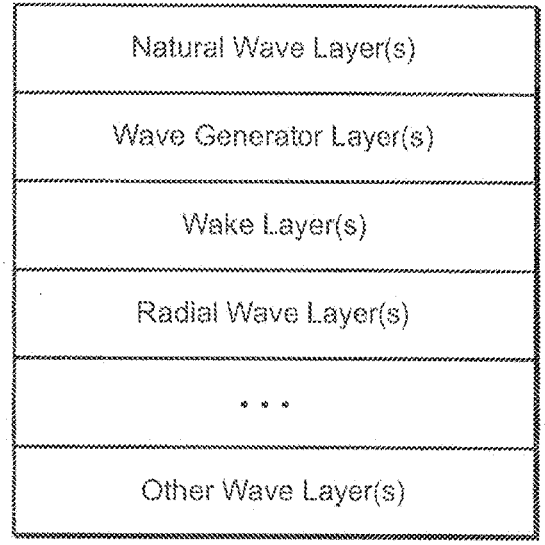
FIG. 4 shows an illustrative surface disturbance layer modeling arrangement.

The following is an illustrative description of water layers that might be used in a typical exemplary video game (see FIG. 4):

Natural Wave Layer Type

This layer provides a general feel and look of the water. It could make the overall water look gentle or choppy for example. In the exemplary illustrative embodiment, there is only one of this layer type. However, multiple layers of this type can be setup if desired. In general, a layer of this type consumes a constant amount of CPU/GPU processing cycles.

Wave Generator Layer Type

Figure 5:
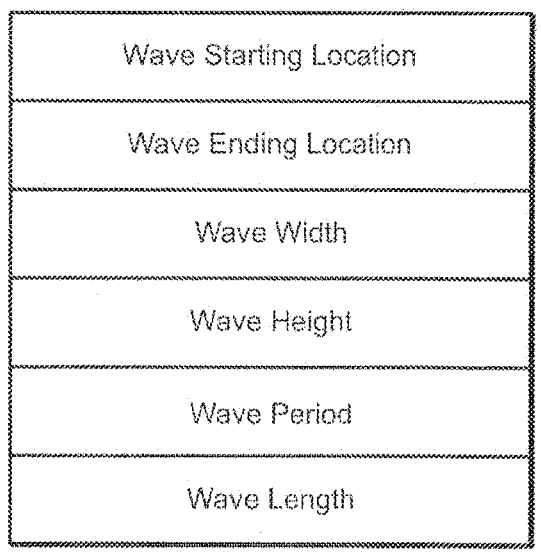
FIG. 5 shows illustrative wave modeling properties.

This layer is used to keep track of actual waves on the water's surface. It keeps track of the wave properties for example. As shown in FIG. 5, the properties may include:

the wave starting location,
the wave ending location,
the wave width,
the wave height (amplitude),
the wave period (the amount of time for needed to complete one wave cycle), and
the wave length.

These various properties will be defined in the exemplary embodiment if the wave is a big tsunami (tidal) wave or just a little ripple from a small waterfall. In the illustrative embodiment, the wave properties can be dynamically altered based on certain conditions in the game. The number of layers of this type may vary depending on the game level. For example, in one level, there might be only be one. In other level, there could be more than ten (or any number) of such layers. Adjusting the number of layers of this type in a given area will adjust the CPU/GPU consumption in that area.

Wake Layer Type

In the exemplary embodiment, the wake layer is used to keep track the wake that is generated by moving object on the water. Ideally, there will be one wake layer for each object that generates wake. However, in certain cases, it is possible to use just one layer for multiple objects. Adjusting how far the wake propagates will adjust the CPU/GPU consumption.

Radial Wave Layer Type

The radial wave layer is used in the illustrative embodiment to keep track of waves that are generated by objects dropped into the water. The number of layers of this type depends on how many objects are dropped in the water within a given period of time. Adjusting how often an object is dropped into the water and how far the radial wave propagates in a given area will adjust the CPU/GPU consumption in that area.

Other Wave Types.

Although the exemplary and illustrative embodiment uses the different layer types described above, many other type can be created. For example, a layer type that keeps track of waves generated by wind can be included. Or in another embodiment, a layer type that defines a whirl pool can be included. Other wave or fluid disturbance types are possible.

Exemplary Dynamic Polygon Mesh Generation

The usual way to generate a polygon mesh for a water surface is to generate a uniform sized grid of quads or hexagons. This kind of method works fine for a small area of water surface or for non-real time purpose (like in commercial rendering packages). However, in the preferred exemplary embodiment, it is desirable to efficiently generate a relatively big mesh to cover the water surface. Using a uniform grid is generally not practical since too much computation is involved and it will not be possible to generate the number of required polygons needed within the relatively small amount of time available in real time rendering. Also, many of the polygons will become so small in the screen that they are not worth the time spent. Therefore, the preferred exemplary embodiment uses an adaptive polygon mesh generator.

Figure 6:
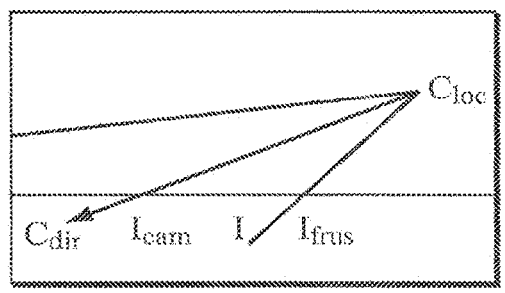
FIG. 6 shows an illustrative adaptive polygon mesh determination.

This illustrative embodiment generates the polygon mesh based the camera location and direction in the 3D world. Specifically, it depends on a point 'I'. FIG. 6 shows an illustrative determination of point "I" used for dynamically generating a polygon mesh based on camera location and direction. Note that in this context, "camera" does not refer to a real camera, but rather to a virtual camera that, at least in a non-limiting instance, the user can adjust the position, angle and/ or location of in order to adjust his or her view of the virtual 3D world (in other words, the user 'sees' the 3D world through this virtual camera).

FIG. 6 shows an illustrative plot of camera viewing angle, location and direction versus a location "I" determined therefrom. In illustrative FIG. 6:

$C_{loc}$: is the Camera location in 3D space,
$C_{dir}$: is the Camera direction in 3D space,
$I_{cam}$: is the intersection of the camera direction vector with the water surface,
$I_{frus}$: is the intersection of the lower camera frustum vector with the water surface, and
I: is an interpolated point between $I_{cam}$ and $I_{frus}$ (it depends on how level the camera direction is).

This point location "I" is, in the illustrative embodiment, interpolated between '$I_{cam}$' and '$I_{frus}$'. The interpolant is the angle between the camera direction vector and the water surface.

In the illustrative embodiment, as the camera direction becomes more aligned with the water surface, 'I' will go toward '$I_{frus}$'. As the camera direction becomes more perpendicular with respect to the water surface, 'I' will go toward '$I_{cam}$'. 'I' will be set to '$I_{frus}$' if the camera direction vector does not intersect the water surface.

The illustrative embodiment will generate smaller polygons near 'I' and bigger polygons farther from 'I'. This means the parts of the mesh near 'I' have a higher resolution than the parts of the mesh that are farther from 'I'—providing an inherent level of detail feature. This results in a more uniform polygon size on the screen—minimizing the amount of time spent generating small polygons. The illustrative embodiment, in general, generates fewer polygons to cover the same area, as compared to a uniform grid. It also reduces the level of detail feature as the camera becomes more perpendicular to the water surface. This way, it does not generate skewed polygons when the camera looks right down onto the water; instead, the illustrative embodiment generates a perfectly uniform size polygon grid in such instance. The illustrative embodiment also scales the polygon size dynamically based on how far is the camera to point 'I'. This ensures that the polygons on the screen stay roughly the same size.

Example Techniques for Creating Water Droplet and Other Effects

The exemplary and illustrative embodiment also provides a capability for generating effects such as water droplets, ice or other coatings on a window pane or other see-through (transparent or translucent) viewing surface. In a video game or other interactive real time computer graphics presentation, the display screen can sometimes seem to the user to be a window through which the user is watching the action. If a wave or splash strikes the display screen "window", it may be desirable to add realism by simulating the effects of viewing the scene through water droplets, ice crystals or other coatings that stay on the display screen "window" (and, in one illustrative embodiment, may run down the virtual window for a time). The preferred exemplary, non-limiting embodiment provides such effects through use of indirect texture mapping techniques.

Figure 7:
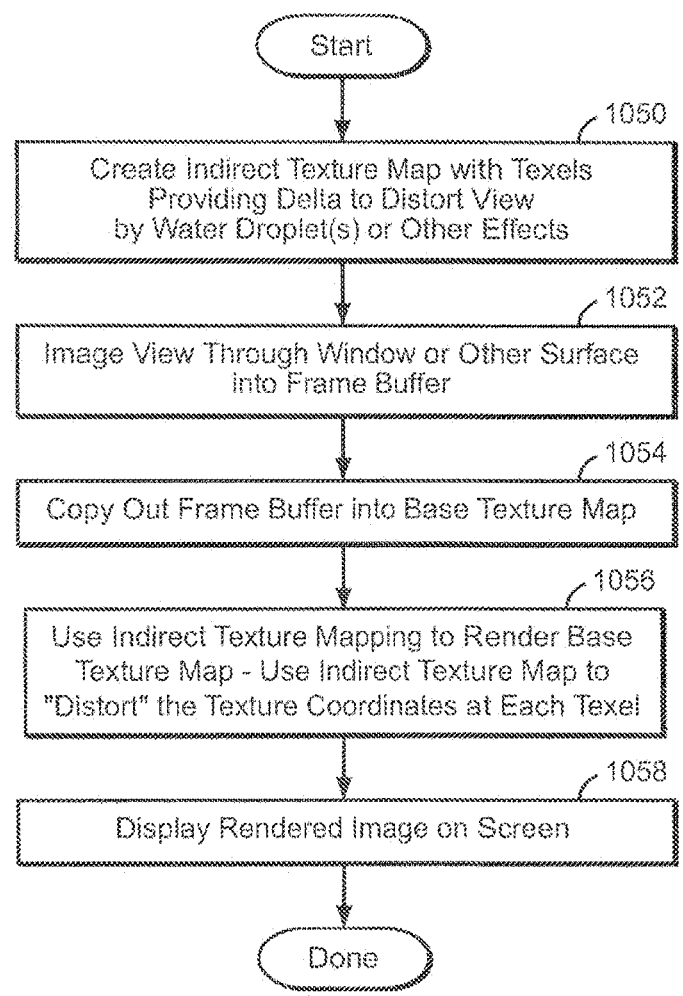
FIG. 7 shows an example rendering process for water droplets and other effects.

The general mechanism that preferred exemplary system 50 provides for indirect texture mapping is described in some detail in copending commonly assigned U.S. patent application Ser. No. 09/722,382 filed Nov. 28, 2000. In the preferred exemplary embodiment, software executing on system 50 creates an indirect texture map that models the imaging distortion that would be produced by water droplets on a window (FIG. 7, block 1050). In the exemplary and non-limiting embodiment, each texel in the indirect texture map provides a "delta" or difference that will be used to distort the view on the screen. Each texel in the preferred exemplary indirect texture map is used as an offset for a texture coordinate lookup into another texture comprising the undistorted version of the area of the screen to which the water droplet effect will be applied. In the exemplary embodiment, the indirect texture map is preferably of a type intensity alpha where one channel specifies a U offset and the other specifies a V offset. Note that the indirect texture map need not be static, but may change with time (e.g., to model water droplets streaming across the viewing surface under the force of wind, gravity or the like).

Figure 8A:
FIGS. 8A-8E show exemplary illustrative screen effects.
Figure 8B:
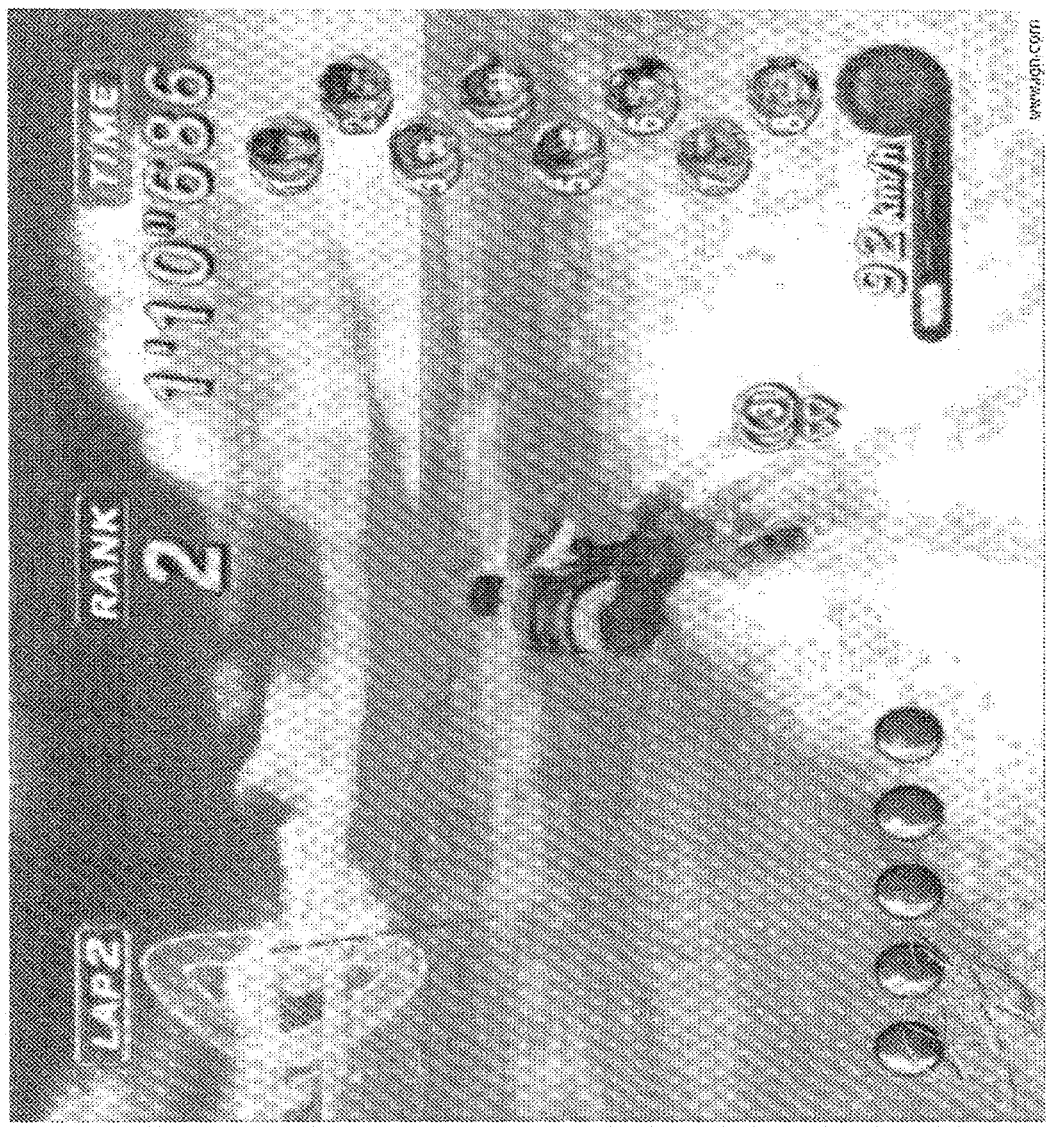
Figure 8C:
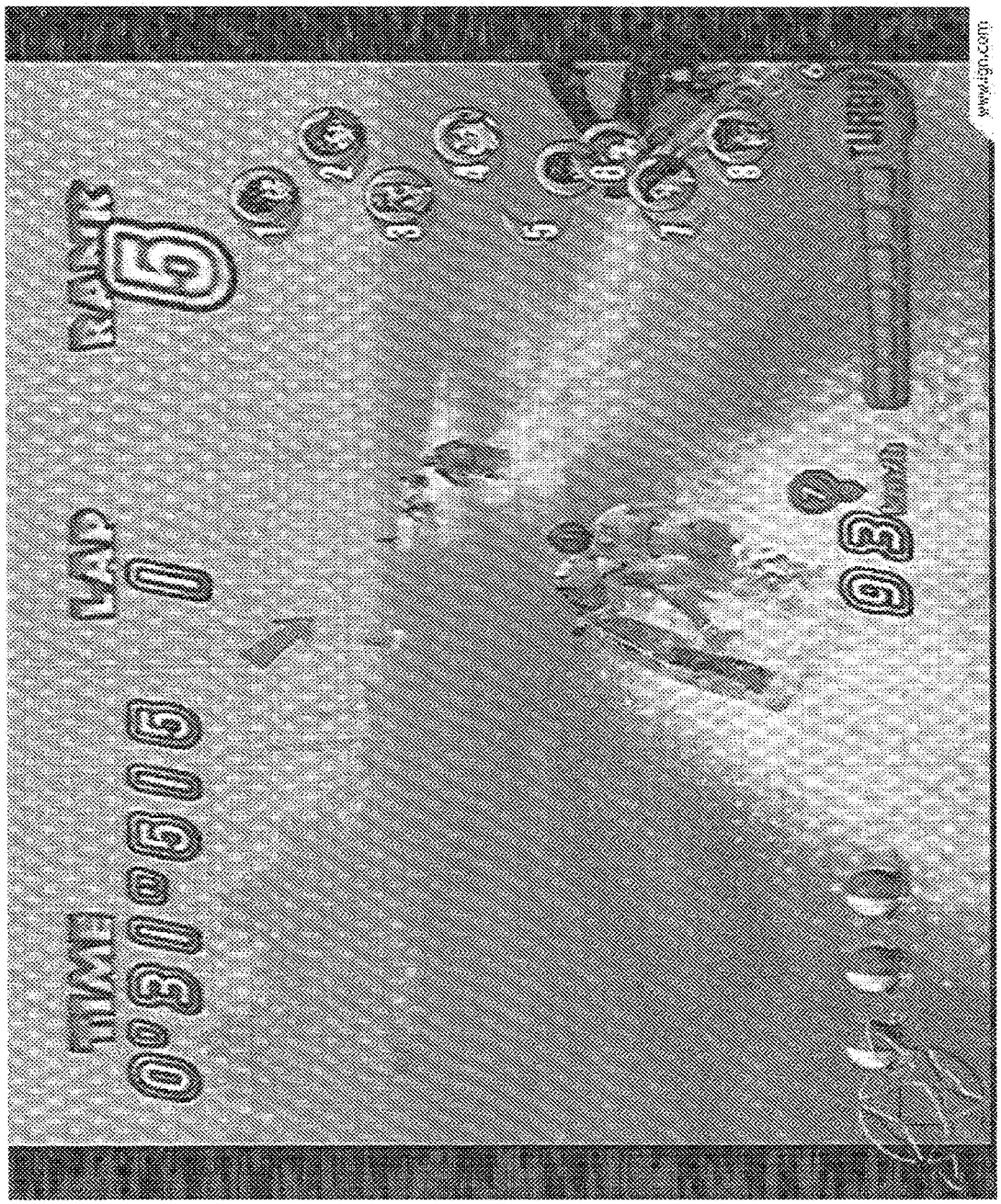
Figure 8D:
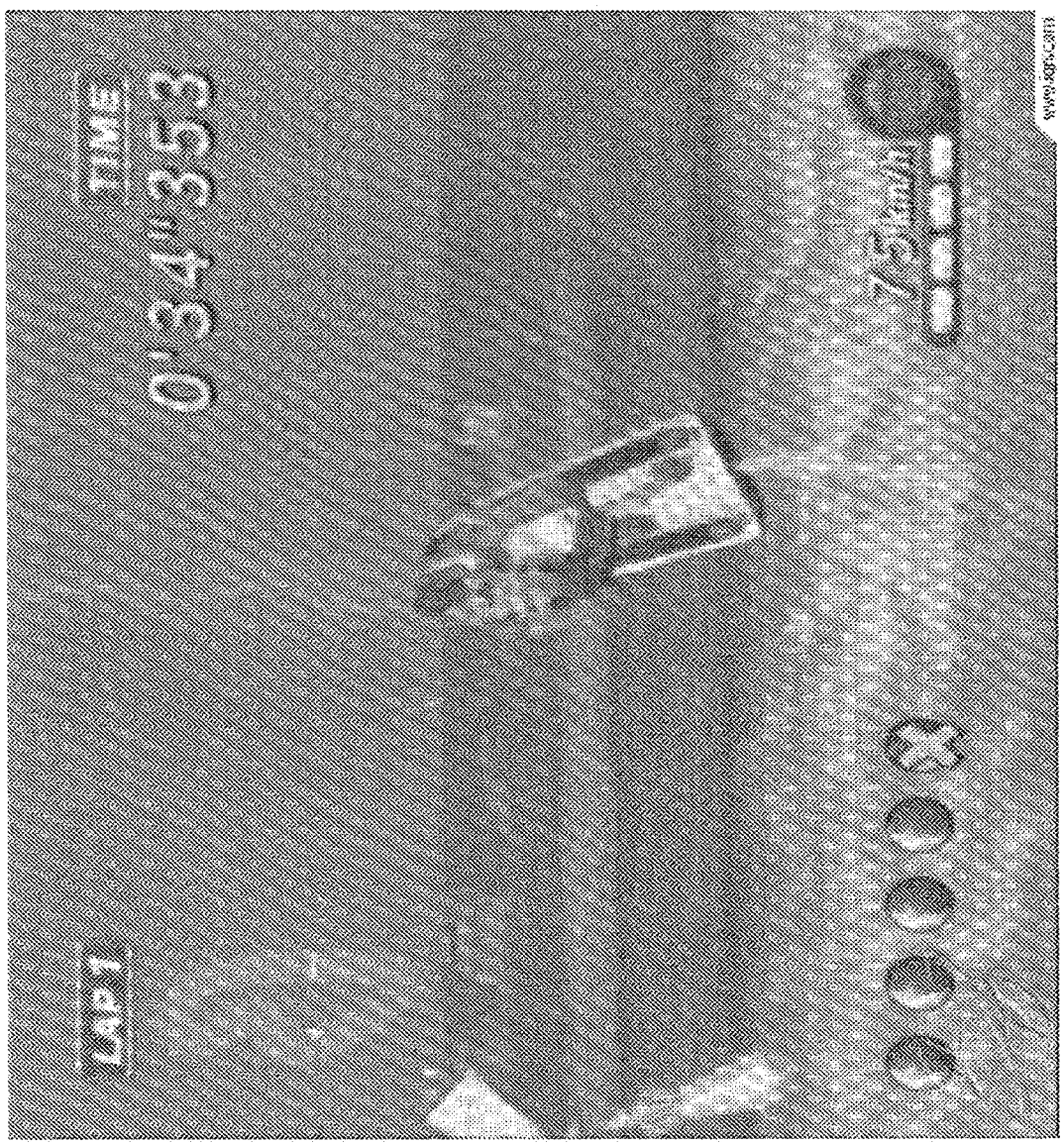
Figure 8E:
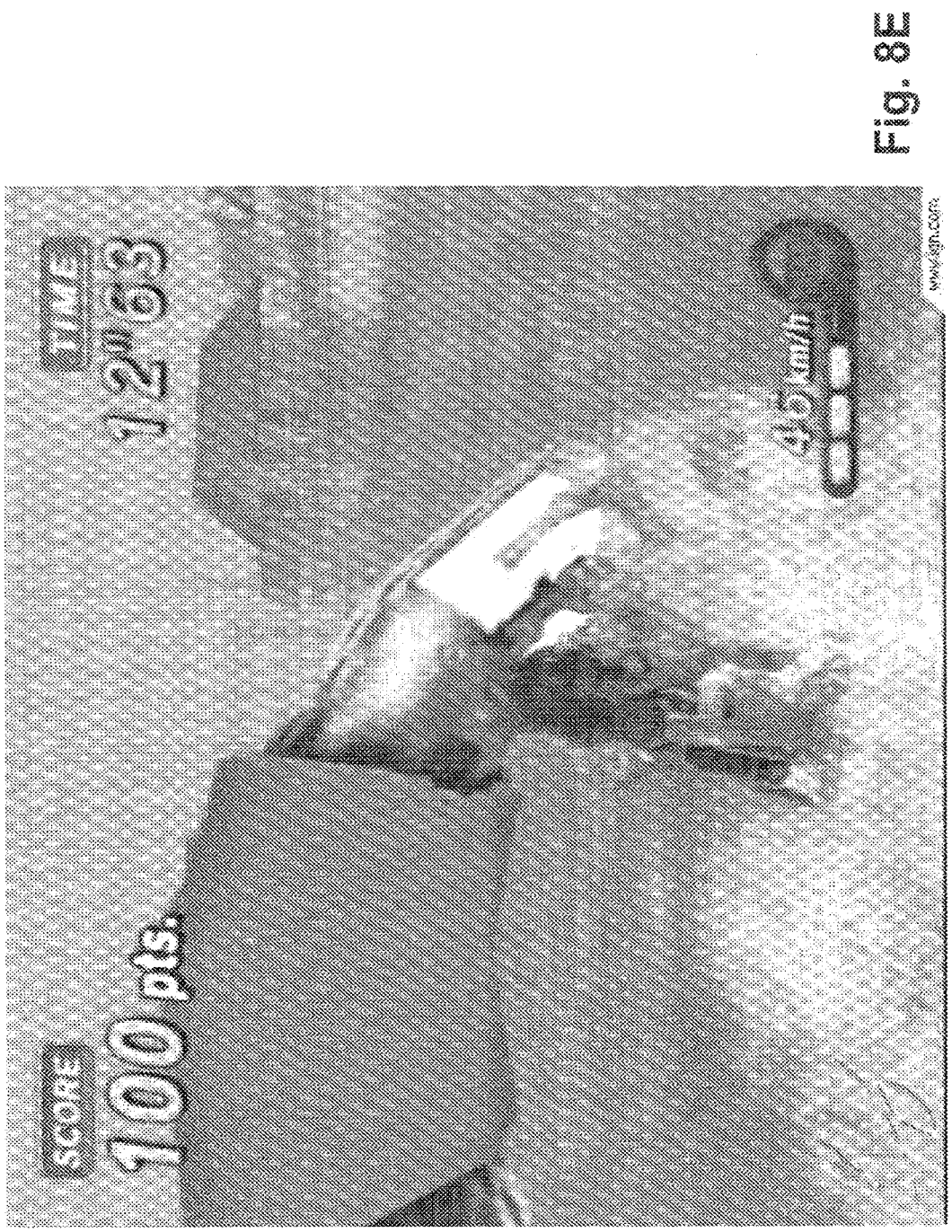

The preferred illustrative, non-limiting exemplary embodiment then images the view through the virtual window or other viewing surface into a frame buffer (block 1052), and copies out the frame buffer into a base texture map (block 1054) using techniques as described in U.S. patent application Ser. No. 09/722,663 filed Nov. 28, 2000. The base texture map is now rendered using the indirect texture map to distort the texture coordinates at each texel (FIG. 7, block 1056). The rendered image is now displayed on the screen distorted by the water droplet indirect map. In the exemplary embodiment, this entire process can be completed in one 30-second frame time. FIG. 8E shows an example visual effect created using the exemplary process.

Each document mentioned herein is expressly incorporated by reference as if expressly set forth.

While the invention has been described in connection with what is presently considered to be the most practical and preferred embodiment, it is to be understood that the invention is not to be limited to the disclosed embodiment. For example, these techniques are not restricted to modeling water surface, but rather can be applied to almost any other kind of surface including but not limited to fluids, particles or any other type of surface or apparent surface. Furthermore, these techniques are particularly advantageous when used for real time or near real time imaging, but are by no means limited to real time or near real time imaging. To the contrary, the present is intended to cover various modifications and equivalent arrangements included within the scope of the appended claims.

The invention claimed is:

1. A system comprising:
a texture memory that stores (a) a first texture map comprising a first set of texels providing difference offsets modelling distortion, and (b) a second texture map comprising a second set of texels representing an image;
a texture mapper that accesses the first set of texels of the first texture map in a first texture mapping operation, and uses the accessed first set of texels as texture coordinates to access the second set of texels of the second texture map in a second, subsequent texture mapping operation that texture-maps the image represented by the second set of texels of the second texture map; and
an output circuit that outputs the texture-mapped image for display.

2. The system of claim 1 wherein the texture mapper texture maps the second set of texels onto a window, and the distortion simulates image distortion of the image that a coating on the window introduces.

3. The system of claim 1 wherein the distortion comprises lens distortion.

4. The system of claim 1 wherein the second texture mapping operation simulates viewing through a transparent surface.

5. The system of claim 1 wherein first set of texels models surface distortion.

6. The system of claim 1 wherein the image comprises an image of a scene as seen through a window or a lens.

7. A graphical display system comprising:
a user input device;
a processor coupled to the user input device, the processor generating graphics commands in response to inputs received from the user input device; and
a graphics pipeline coupled to the processor, the graphics pipeline including:
a graphics generator that dynamically generates a sequence of changing images in response to the graphics commands,
a texture memory that stores (a) a first texture map comprising a first set of texels providing difference offsets modelling distortion, and (b) a second texture map comprising a second set of texels representing the dynamically changing images,
a texture mapper that accesses the first set of texels of the first texture map in a first texture mapping operation, and uses the accessed first set of texels as texture coordinates to access the second set of texels of the second texture map in a second, subsequent texture mapping operation that distortion-maps the dynamically-changing image represented by the second set of texels, and
an output circuit that outputs the distortion-mapped images for display.

* * * * *